(12) United States Patent
Fechtel

(10) Patent No.: US 10,057,389 B2
(45) Date of Patent: Aug. 21, 2018

(54) METHODS AND DEVICES FOR PROCESSING A DATA FRAME

(71) Applicant: Stefan Fechtel, Zorneding (DE)

(72) Inventor: Stefan Fechtel, Zorneding (DE)

(73) Assignee: Intel Deutschland GmbH, Neubiberg (DE)

( * ) Notice: Subject to any disclaimer, the term of this patent is extended or adjusted under 35 U.S.C. 154(b) by 140 days.

(21) Appl. No.: 13/903,541

(22) Filed: May 28, 2013

(65) Prior Publication Data

US 2014/0355626 A1 Dec. 4, 2014

(51) Int. Cl.
*H04L 29/06* (2006.01)
*H04L 27/26* (2006.01)

(52) U.S. Cl.
CPC .......... *H04L 69/22* (2013.01); *H04L 27/2605* (2013.01)

(58) Field of Classification Search
CPC . H04L 27/2605; H04L 69/22; H04L 27/2607; H04L 1/0003; H04L 27/2636; H04L 1/007; H04L 1/001; H04L 27/2647; H04L 27/2626; H04L 27/2675; H04L 27/2646; H04L 5/0078–5/0089; H04J 11/00; H04W 4/00; H04W 72/042; H03M 13/09; H04B 7/0413
USPC ........ 370/203, 210, 280, 328, 474; 375/260, 375/340; 714/800
See application file for complete search history.

(56) References Cited

U.S. PATENT DOCUMENTS

2004/0066802 A1* 4/2004 Ro ..................... H04L 27/2607
370/528

2009/0034638 A1* 2/2009 Sawahashi .......... H04L 27/2605
375/260
2009/0122771 A1* 5/2009 Cai .............................. 370/338
2009/0285321 A1* 11/2009 Schulz ................ H04L 27/2607
375/267
2009/0304126 A1* 12/2009 Sahara ................ H04L 27/2605
375/343

(Continued)

FOREIGN PATENT DOCUMENTS

CN           1792043 A     6/2006
CN         101208889 A     6/2008

(Continued)

OTHER PUBLICATIONS

Partial International Search dated Sep. 2, 2014 for International Application No. PCT/EP2014/060423.

(Continued)

*Primary Examiner* — Walli Butt
(74) *Attorney, Agent, or Firm* — Schiff Hardin LLP

(57) ABSTRACT

A method including processing a data frame, the data frame having a predetermined frame size and including at least one data symbol configured to form a plurality of sub-carriers in the frequency domain, wherein each of the at least one data symbol comprises a user data portion and a guard interval portion, wherein each of the at least one data symbol includes a plurality of sub-symbols, and wherein at least one of the following parameters is variable during the processing: a size of the guard interval portion, a size of the user data portion, a size of the at least one data symbol, a number of data symbols the data frame comprises, a content of the guard interval portion, and a configuration of the sub-symbol boundaries.

20 Claims, 9 Drawing Sheets

(56) References Cited

U.S. PATENT DOCUMENTS

| | | | |
|---|---|---|---|
| 2011/0038434 A1* | 2/2011 | Sawahashi | H04L 27/2605 375/260 |
| 2012/0054587 A1* | 3/2012 | Van Nee | H04L 1/0079 714/807 |
| 2012/0183107 A1* | 7/2012 | Zhu | H04L 25/0216 375/348 |
| 2012/0294392 A1* | 11/2012 | Zhang | H04L 5/0023 375/340 |
| 2013/0034054 A1* | 2/2013 | Wu | H04L 27/2602 370/328 |
| 2013/0185617 A1* | 7/2013 | Roh et al. | 714/800 |

FOREIGN PATENT DOCUMENTS

| | | |
|---|---|---|
| CN | 102857284 A | 1/2013 |
| EP | 1881628 A1 | 1/2008 |
| EP | 2337293 A1 | 6/2011 |

OTHER PUBLICATIONS

Mario Huemer, et al: "Non-Systematic Complex No. RS Coded OFDM by Unique Word pre Fix" vol. 60, No. 1, Jan. 2012, pp. 285-299.

Huemer, et al., "The Potential of Unique Words in OFDM", Proc. 15$^{th}$ Int'l OFDM Workshop, Hamburg, Germany, Sep. 2010.

Huemer, et al., "Complex Number RS Codd OFDM With Systematic Noicse in the Guard Interval", Proc. Asimomar Conference, Systems and Computers, Pacific Grove, U.S.A., Nov. 2011.

Speth, et al., Optimum Receiver Design for Wireless Broad-Band Systems Using OFDM—Part I, IEEE Transactions on Communications, vol. 47, No. 11, Nov. 1999.

Huemer, et al., "Non-Systematic Complex Number RS Coded OFDM by Unique Word Prefix", IEEE Transactions on Signal Processing, vol. 60, No. 1, Jan. 2012.

Henkel, et al., "Inherent Time-Frequency Coding in OFDM—a Possibility for ISI Correction Without a Cyclic Prefix", Proc. 14$^{th}$ Int'l OFDM Workshop 2009, Hamburg, Germany 2009.

3GPP TS 36.211, "Evolved Universal Terrestrial Radio Access (E-UTRA); Physical Channels and Modulation", V11.0.0, Oct. 2009.

ETSI TS 136 211, "Evolved Universal Terrestrial Radio Access (E-UTRA); Physical Channels and Modulation", V9.1.0, Apr. 2010.

ETSI En 300 744, "Digital Video Broadcasting (DVB); Framing Structure, Channel Coding and Modulation for Digital Terrestrial Television", V1.5.1, Jun. 2004.

Office Action dated Jan. 8, 2018 for Chinese Application No. 201480022617.1.

\* cited by examiner

METHODS AND DEVICES FOR PROCESSING A DATA FRAME

TECHNICAL FIELD

The disclosure relates to methods and devices for processing a data frame comprising at least one data symbol, in particular at least one OFDM data symbol.

BACKGROUND

In orthogonal frequency division multiplexing (OFDM) communication systems, the guard interval (GI) length is fixed and defined such that it covers the longest multipath delay encountered in a worst-case scenario, that is, large cell size, long range and reflection at distant objects. In more advanced standards such as Digital Video Broadcasting-Terrestrial (DVB-T) according to ETSI ETS 300744, V1.5.1, 2004 or Long Term Evolution (LTE) according to ETSI TS 136211, version 11.0.0 Release 11, October 2012, different GI lengths are defined, e.g., the three GI lengths associated with LTE formats that are: normal cyclic prefix (CP) according to 4.69 μs for the majority of macro cells, extended CP according to 16.67 μs for large cells and small single-frequency networks, and another extended CP according to 33.33 μs for large SFN. These GI lengths, however, are chosen by the operator based on cell planning and are fixed during operation.

A major issue with conventional CP-OFDM is the missing flexibility of the guard interval in terms of length and content. During operation, the GI cannot be tailored to the prevalent channel dispersion. Therefore, the GI length is usually chosen conservatively to cover the worst-case channel dispersion expected. Under typical, more benevolent channel conditions, this entails a substantial loss of transmission capacity and throughput, a disadvantage which also translates into multi-user environments, i.e., the GI length cannot be tailored to individual users.

Another issue with conventional CP-OFDM is the interdependence between the GI length and the frame format in which OFDM symbols are embedded. A change in GI length (if possible at all) necessarily entails a change in the frame structure, i.e., the number of OFDM symbols in a frame. For instance, if it were possible to switch between the three LTE CP lengths during operation, the frame format would have to change also. As there are very few possibilities of casting variable-length OFDM symbols into a frame of fixed length, GI flexibility is severely limited in single-user scenarios and impossible to achieve in multi-user environments.

BRIEF DESCRIPTION OF THE DRAWINGS

The accompanying drawings are included to provide a further understanding of aspects of the disclosure and are incorporated in and constitute a part of this specification. The drawings illustrate aspects and together with the description serve to explain principles of aspects. Other aspects and examples and many of the intended advantages of aspects and examples will be readily appreciated as they become better understood by reference to the following detailed description. Like reference numerals designate corresponding similar parts.

DETAILED DESCRIPTION

Figure 1:
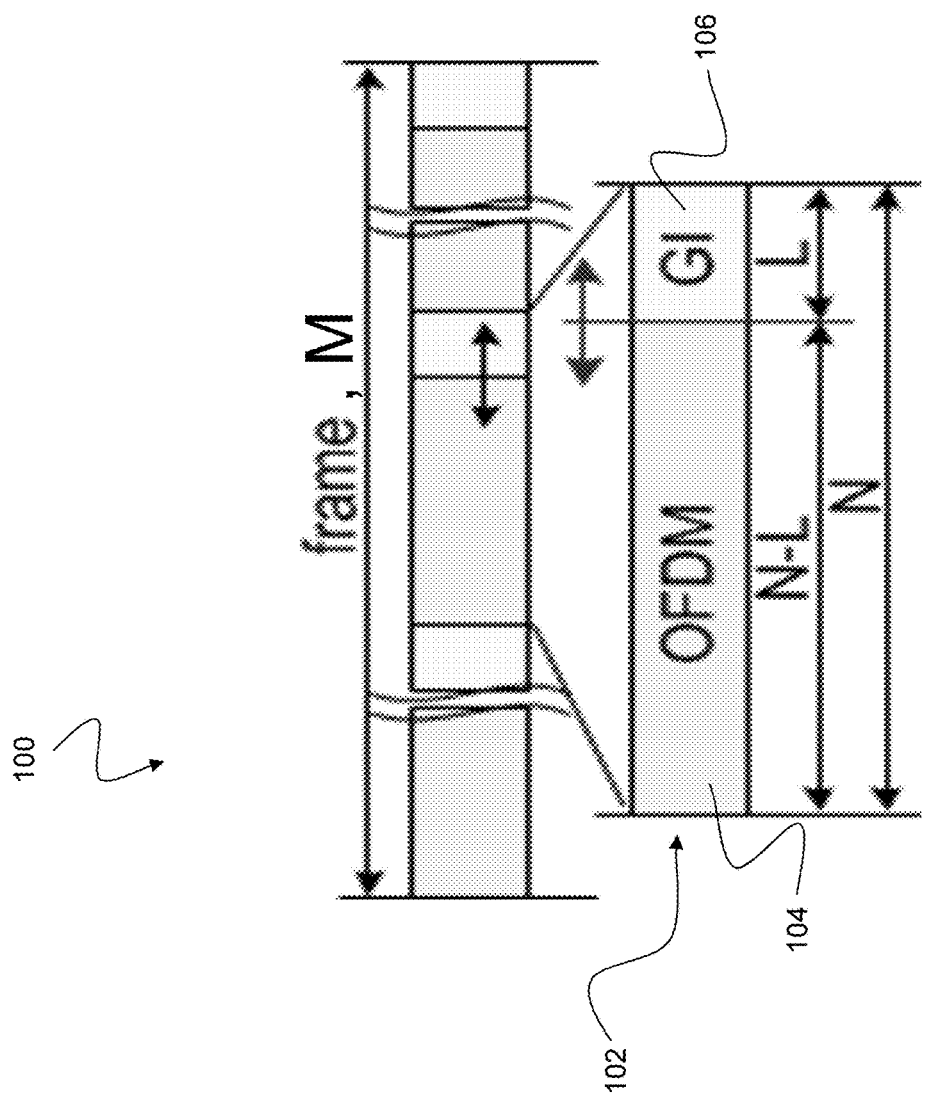
FIG. 1 illustrates an example of a data frame carrying data symbols.

The aspects and examples are described with reference to the drawings, wherein like reference numerals are generally utilized to refer to like elements throughout. In the following description, for purposes of explanation, numerous specific details are set forth in order to provide a thorough understanding of one or more aspects or examples. It may be evident, however, to one skilled in the art that one or more aspects or examples may be practiced with a lesser degree of the specific details. In other instances, known structures and elements are shown in schematic form in order to facilitate describing one or more aspects or examples. It is to be understood that other examples may be utilized and structural or logical changes may be made without departing from the scope of the disclosure.

In addition, while a particular feature or aspect of an example may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present disclosure is defined by the appended claims.

The devices and methods as described herein can be utilized as part of and for radio transmission systems, namely for systems operating in the Orthogonal Frequency Division Multiplex (OFDM) mode. The devices disclosed may be embodied in baseband segments of devices used for the transmission or reception of OFDM radio signals, in particular base stations, relay stations, mobile phones, handheld devices or other kinds of mobile radio receivers. The described devices may be employed to perform methods as disclosed herein, although those methods may be performed in any other way as well.

The following description may be read in connection with any kind of multiple carrier radio transmission systems, in particular any mobile communications systems employing multiple carrier modulation, such as, for example, the Universal Mobile Telecommunications System (UMTS) Standard or the Long Term Evolution (LTE) Standard.

The following description may also be read in connection with multiple carrier radio transmission systems in the field of digital video broadcasting (DVB-T/H) which is based on terrestrial transmitters and a communication system design adapted for mobile or hand-held receivers. However, also other communications systems, for example, satellite OFDM systems or digital subscriber line (DSL) systems, may benefit from the concepts and principles outlined herein.

The methods and devices as described herein may be utilized with any sort of antenna configurations employed within the multiple carrier radio transmission system as described herein. In particular, the concepts presented herein are applicable to radio systems employing an arbitrary number of transmit and/or receive antennas, that is Single Input Single Output (SISO) systems, Single Input Multiple Output (SIMO) systems, Multiple Input Single Output (MISO) systems and Multiple Input Multiple Output (MIMO) systems.

Referring to FIG. 1, an example of a data frame 100 carrying data symbols 102 is shown. The data frame 100 has a predetermined frame size M and includes a plurality of data symbols 102 configured to form a plurality of sub-carriers in the frequency domain. Each data symbol 102 includes a user data portion (OFDM) 104 and a guard interval portion (GI) 106 which may include a guard word (GW). At least one of the following parameters is variable during the processing of the data frame 100: a size L of the guard interval portion 106, a size N–L of the user data portion 104, a size N of the data symbol 102, a number of data symbols 102 the data frame 100 comprises, and a content of the guard interval portion 106.

In one example, the data symbol 102 is encoded according to an orthogonal frequency division multiplexing technique. In one example, the guard interval portion 106 includes a guard word. In one example the guard word is a predetermined guard word. In one example, the size of the data symbol 102 is variable with respect to a power of two of a basic data symbol size, for example of a byte or a word. In one example, the size L of the guard interval portion 106 is based on at least one of the following parameters: a channel delay spread, a modulation and coding set, a MIMO layer and antenna configuration, and a link direction, e.g., upstream or downstream. In one example, the size N of the data symbol 102 and the number of data symbols 102 the data frame includes are predetermined and at least one of the size L and content of the guard interval portion 106 of the data symbol 102 are selectable on a user specific basis.

With respect to OFDM systems, the symbol format of the data frame 100 depicted in FIG. 1 is also called variable-guard OFDM symbol format (VG-OFDM) and the symbol 102 is denoted as OFDM symbol.

The data frame 100 can have any number of OFDM symbols 102, for example a number of eight OFDM symbols or any other power of two, a number of 3, 6, 7 or any other number.

In VG-OFDM, the guard interval is included in the (I)DFT OFDM (de)modulation window whose length is equal to the OFDM symbol length N. The OFDM symbol 102 so defined comprises a "useful" part of length N–L denoted here as the user data portion 104 and a guard interval of length L denoted here as the guard interval portion 106 filled with a guard word (GW). FIG. 1 shows the guard interval portion 106 at the end of the OFDM symbol 102, but it may also be located at the start or at both ends of the OFDM symbol 102. In one example, the VG-OFDM format features variable GI length L within a framework of fixed-length OFDM symbols 102 embedded in a fixed or predetermined frame 100 structure.

In one example, VG-OFDM is used for supporting the unique word (UW)-OFDM format as both are designed to include the GI 106 in the OFDM symbol 102. Thus, VG-OFDM supports the UW-OFDM features of a unique, i.e. fixed word filling the GI 106 for the purpose of realizing some Reed-Solomon (RS) coding gain and aiding synchronization and channel estimation. However, VG-OFDM additionally features a guard interval 106 of variable length and likewise variable content, that is, the guard word. VG-OFDM is a versatile format characterized by the new flexibility of being adaptive to time-variant and/or user-specific channel and transmission characteristics.

Advantages of VG-OFDM are the following: The variable guard interval 106 can be adapted to the channel and transmission conditions on the link that are for example channel delay spread and other link parameters. If the channel delay spread T is shorter than the GI 106 currently used (T<L), the GI length L is reduced and a shorter GW is selected. This avoids unnecessary loss of transmission power and data rate, thus increasing transmission efficiency and throughput. If the channel delay spread T exceeds the guard interval 106 currently used (T>L), the GI length L is increased and a longer GW is selected. This avoids inter-symbol interference, thus maintaining transmission quality. With respect to other link parameters, the GI 106 can further be tuned to parameters such as the MCS (modulation/coding set), the MIMO layers/antennas, or the link direction (uplink/downlink). The frame format, i.e., the number of OFDM symbols per frame, is independent of the GI adaptation. The frame format can remain fixed, hence, it is simpler to define, standardize, and implement. A suitably defined fixed frame format can accommodate OFDM symbols 102 of different lengths N which is a feature that further extends the range of GI lengths.

The novel signal format VG-OFDM is thus characterized by variable, possibly user-specific guard intervals which are (largely) decoupled from the OFDM symbol length and frame format. A corresponding transmission system is used for transmitting the frames 100.

Figure 2:
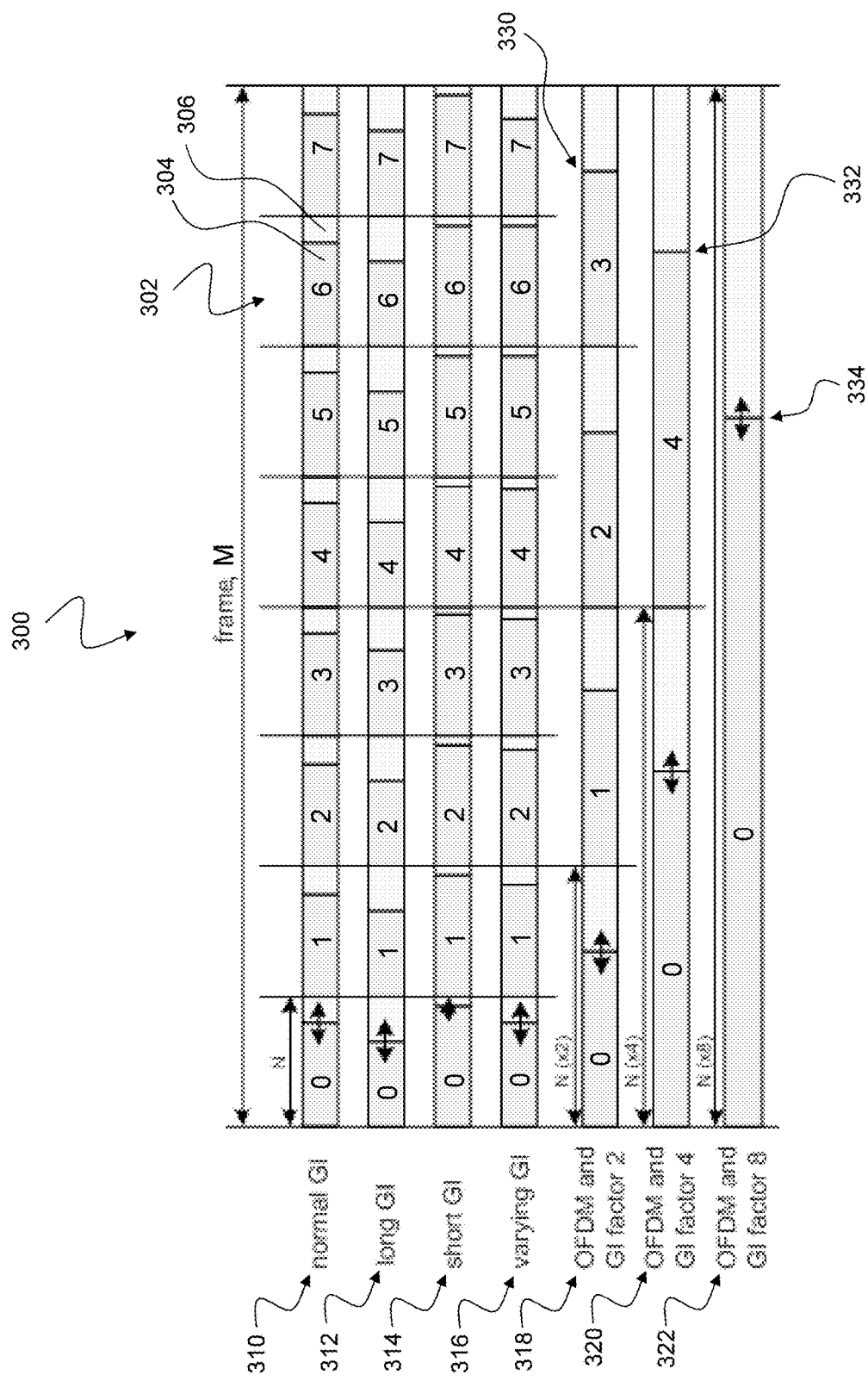
FIG. 2 illustrates examples of data frames carrying data symbols.

Referring to FIG. 2, examples of data frames 300 carrying data symbols 302 are shown. The data frame 300 has a predetermined frame size M and includes a plurality of data symbols 302 configured to form a plurality of sub-carriers in the frequency domain. In FIG. 2, an exemplary number of eight data symbols 302 is depicted for the first 310, second 312, third 314 and fourth 316 exemplary data frames, an exemplary number of four data symbols 330 is depicted for the fifth exemplary data frame 318, an exemplary number of two data symbols 332 is depicted for the sixth exemplary data frame 320 and an exemplary number of one data symbol 334 is depicted for the seventh exemplary data frame 322. The data frame 300, however, can have any other number of data symbols 302, 330, 332, 334, for example any other power of two, a number of 3, 6, 7 or any other number. Each data symbol 302, 330, 332, 334 includes a user data portion 304 and a guard interval portion 306 including a guard word (GW). At least one of the following parameters is variable during the processing of the data frame 300: a size L of the guard interval portion 306, a size N–L of the user data portion 304, a size N of the data symbol 302, a number of data symbols 302 the data frame 300 comprises, and a content of the guard interval portion 306. The data frame 300 may be structured according to the examples described above with respect to FIG. 1.

With respect to OFDM systems, the symbol format of the data frame 300 depicted in FIG. 2 is also called variable-guard OFDM symbol format (VG-OFDM) and the symbol 302 is denoted as OFDM symbol.

The first to the third exemplary data frame formats 310, 312, 314 are LTE-like formats with normal/long/short guard intervals 306 which can be changed at frame boundaries. The term "frame" denotes here the shortest repetitive physical structure, in LTE notation, a frame may refer to a slot or a sub-frame. The fourth exemplary data frame format 316 features GI lengths which are varying within a frame, e.g., providing for additional guard time at frame boundaries.

The last three examples, i.e. the fifth to the seventh exemplary data frame formats 318, 320, 322 illustrate how a suitably defined frame structure whose length may be preferably a power of two can accommodate OFDM symbols of different lengths, in particular, multiples of the basic symbol length $N_0$ (here $N=2N_0$, $4N_0$ and $8N_0$). This further enhances guard interval flexibility by extending the range of GI lengths without compromising the useful portion of OFDM symbols. The novel frame structure as depicted in FIG. 2 thus includes the concept of frames where both guard intervals and OFDM symbols have variable length (L, N).

In addition to variable GI length, variable GI content (guard words) can likewise be useful for various purposes. For example, coding the GW sequence (Walsh-Hadamard, Zadoff-Chu, etc.) in a frame can aid frame synchronization and signal separation, long GW enable initial channel estimation at the start of a frame, and null GW let die out transients at the end of a frame. The novel frame structure as depicted in FIG. 2 thus includes the concept of guard words which are variable, including the special case that no GW is inserted (null GW, GI left empty).

Referring to FIG. 3, a schematic block diagram of an OFDM transmission system 400, 410, e.g. a MIMO-OFDM system, is shown. In the (MIMO-)OFDM system, the transmitter (Tx) 400 forms OFDM symbols, each comprising N parallel sub-carriers in the frequency domain (FD), and transforms these into time domain (TD) by the N-IDFT (OFDM modulator) 403. In the receiver (Rx) 410, the TD-signal is transformed back into the frequency domain (FD) by the N-DFT (OFDM demodulator) 413.

Under certain conditions, the complex baseband representation of the received signal $z_k$ after DFT OFDM demodulation for subcarrier k (symbol time index l ignored here) reduces to $$z_k = H_k x_k + n_k \quad k=0,\ldots,N-1 \quad (1)$$

where $x_k$ denote the transmitted FD QAM/PSK modulation symbols, $H_k$ the channel transfer function, and $n_k$ the additive noise plus interference. In order for equation (1) to be valid, ISI (intersymbol interference) caused by multipath channel dispersion must be kept away from the demodulating DFT in the Rx. OFDM therefore features a guard interval (GI) inserted between consecutive OFDM symbols in order to let ISI transients die out before a new symbol begins. In known art, this guard interval is filled with a cyclic prefix (CP) of length L taken from the end of the useful OFDM symbol following the GI. After GI removal in the receiver (correct timing assumed), ISI that does not exceed the GI length L is suppressed, and the cyclic periodicity property (thus orthogonality) of the useful signal is preserved. This establishes equation (1) despite the presence of ISI, however, at the cost of reduced transmission efficiency, i.e., N+L samples must be transmitted to convey N samples of useful information. Equation (1) is also true for aspects of the present disclosure, however with OFDM symbols defined as in FIG. 1, i.e., N samples transmitted to convey N-L samples of useful information.

Figure 3B:
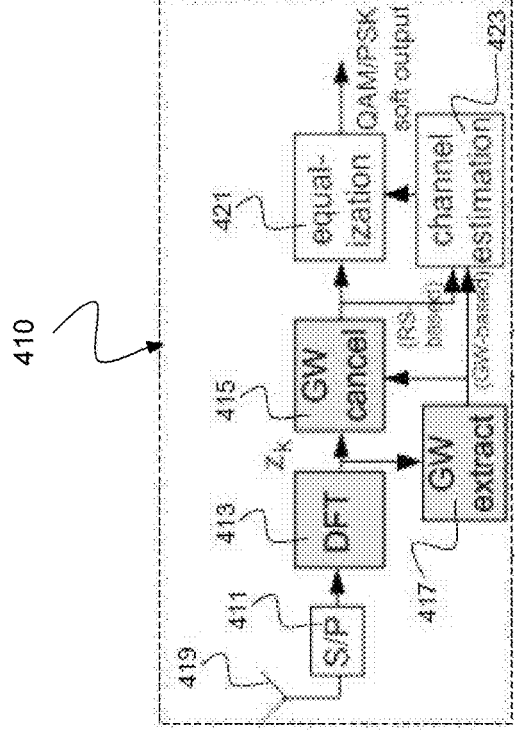
FIG. 3A,B illustrates an exemplary OFDM transmission system.
Figure 3A:
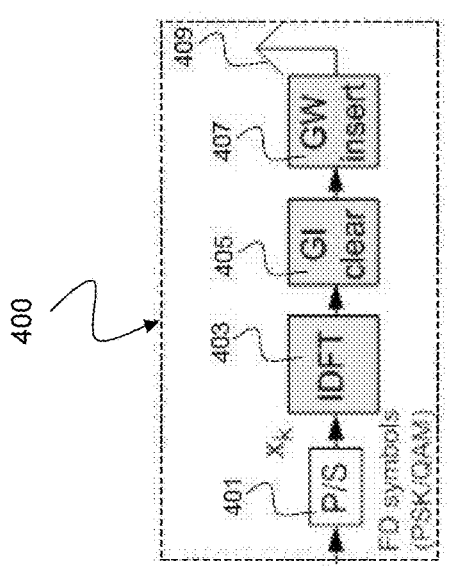
Figure 4B:
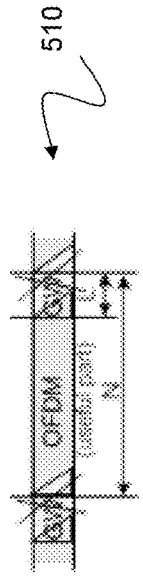
FIG. 4A,B illustrates examples for OFDM symbol formats.
Figure 4A:
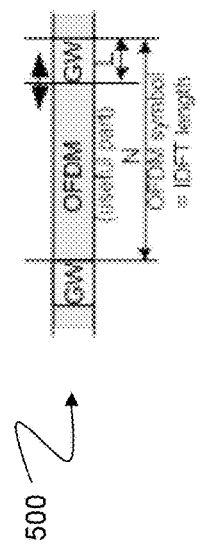

In the transmitter TX 400 of the exemplary transmission system according to an aspect of the disclosure as depicted in FIG. 3a, OFDM symbols are formed, each comprising N parallel sub-carriers in the frequency domain (FD). The OFDM symbols are fed into a parallel/serial (P/S) converter 401 and thereafter they are transformed into the time domain (TD) by an inverse (discrete) Fourier transformation (N-IDFT) in an inverse (discrete) Fourier transformer 403 (also called OFDM modulator). In a guard interval (GI) clearing unit 405 a guard interval is cleared, e.g. set to zero, in the time domain data signal. In a guard word (GW) insertion unit 407 a guard word is added to the time domain data signal as illustrated in FIG. 4a and finally the OFDM symbol 500 is transmitted by a transmission antenna 409.

In the receiver RX 410 of the exemplary transmission system according to an aspect of the disclosure as depicted in FIG. 3b, the OFDM symbol is received by a reception antenna 419 and thereafter, the OFDM symbol is fed into a serial/parallel (S/P) converter 411 which supplies the converted signal to a (discrete) Fourier transformer 413 (also called OFDM demodulator) in which the time domain signal is transformed back into the frequency domain by (discrete) Fourier transformation (N-DFT). Thereafter in a guard word extraction unit 417, the guard word is extracted from the OFDM symbol 510 and in a guard word canceling unit 415, the guard word is canceled from the OFDM symbol 510 as illustrated by the crossings depicted in FIG. 4b. The output of the guard word canceling unit 415 is delivered to an equalization unit 421 and to a channel estimation unit 423. The channel estimation unit 423 supplies the results of the channel estimation to the equalization unit 421 which then provides OFDM symbols at an output thereof. The OFDM symbols input into the P/S converter 411 or output by the equalization unit 421 can be modulated according to quadrature amplitude modulation (QAM) or phase shift keying modulation (PSK) or any other modulation scheme.

The VG-OFDM transmission system shown in FIGS. 3a and 3b basically comprises signal generation and reception, for an VG-OFDM frame as described above with respect to FIGS. 1 and 2. The VG-OFDM transmitter 400 generates (sub-)symbols by clearing the GI (s) of unwanted signals and then inserting GW(s). The VG-OFDM receiver 410 first extracts the guard word(s), preferably in frequency-domain (FD) following OFDM demodulation (DFT), cancels the GW (s) from the data path, and then processes the FD data symbols as usual, i.e. by de-mapping, equalization, etc. In one example, the VG-OFDM channel estimation is based on FD reference symbols (RS) as in CP-OFDM. In one example, the VG-OFDM channel estimation is based on the extracted GW (s). In one example, the VG-OFDM channel estimation is based on a combination of both RS and GW(s).

In one example, the transmitter 400 is implemented by a device including a processor for processing the method 600 as described below with respect to FIG. 5 or the method 1000 as described below with respect to FIG. 8. In one example, at least one of the following units run on the processor: The parallel-serial unit 401, the IDFT unit 403, the GI clear unit 405, the GW insert unit 407.

In one example, the receiver 410 is implemented by a device including a processor for processing the method 600 as described below with respect to FIG. 5 or the method 1000 as described below with respect to FIG. 8. In one example, at least one of the following units run on the processor: The serial-parallel unit 411, the DFT unit 413, the GW extraction unit 417, the GW canceling unit 415, the equalizer 421, the channel estimator 423.

In an example, the processor is implemented as an integrated circuit on a chip. In an example, the processor is implemented as an application specific integrated circuit. In an example, the processor is implemented as a digital signal processor. In an example, the processor is implemented as a processing unit running on a computer system. In an example, the processor is implemented as an arbitrary hardware or software circuit.

Figure 5:
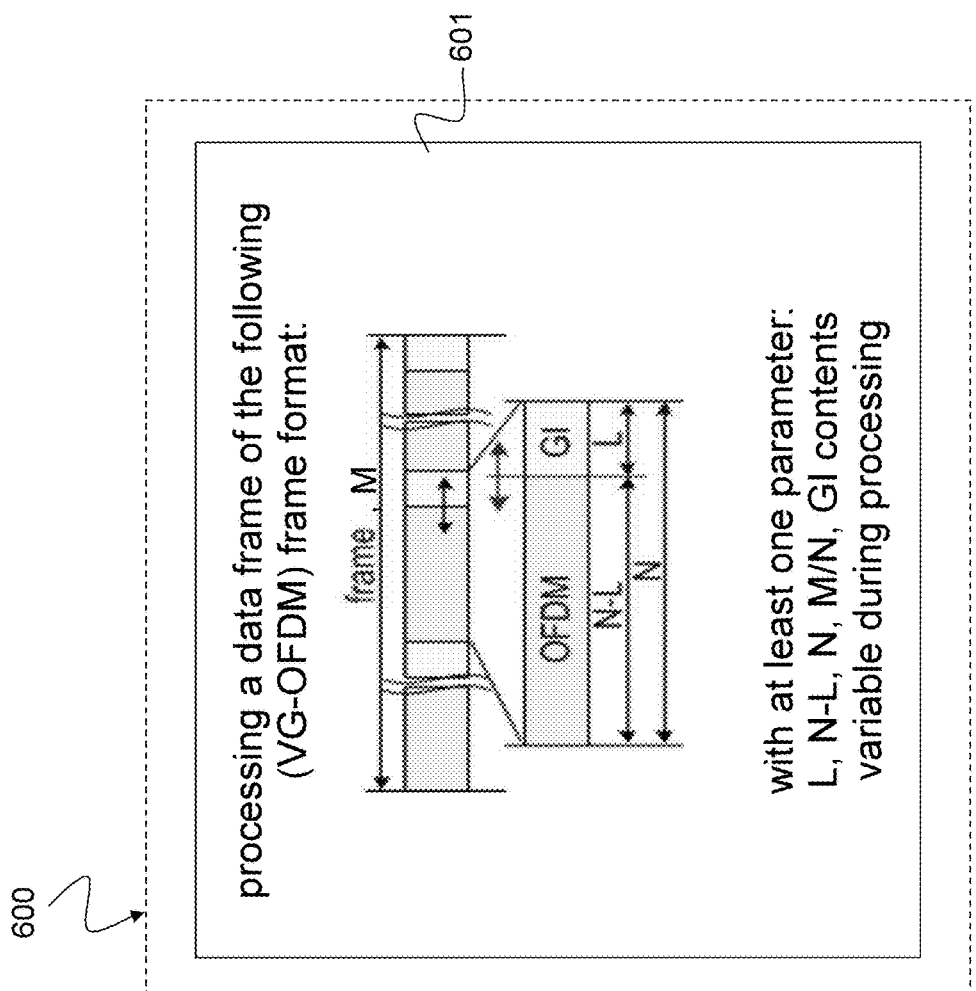
FIG. 5 illustrates a flow diagram of an exemplary method for processing a data frame.

Referring to FIG. 5, a flow diagram of an exemplary method 600 for processing a data frame is shown. The method 600 comprises processing 601 a data frame, the data frame having a predetermined frame size and comprising at least one data symbol configured to form a plurality of sub-carriers in the frequency domain, wherein each of the at least one data symbol comprises a user data portion and a guard interval portion, and wherein at least one of the following parameters is variable during the processing: a size L of the guard interval portion, a size (N–L) of the user data portion, a size of the at least one data symbol, a number of data symbols the data frame comprises, and a content of the guard interval portion.

In one example of the method 600, the at least one data symbol is encoded according to an orthogonal frequency division multiplexing technique. In one example, the method 600 comprises clearing the guard interval portion. In one example, the method 600 comprises inserting a guard word into the guard interval portion. In one example of the method 600, the guard word is predetermined. In one example of the method 600, the size of the at least one data symbol is variable with respect to a power of two of a basic data symbol size. In one example, the method 600 comprises signaling the at least one variable parameter by using signaling information, in particular by using a data byte or a data word. In one example, the method 600 comprises adapting the size L of the guard interval portion based on at least one of the following parameters: a channel delay spread, a modulation and coding set, a MIMO layer and antenna configuration, and a link direction. In one example of the method 600, the size N of the at least one data symbol and the number of data symbols the data frame comprises are predetermined and wherein at least one of the size and content of the guard interval portion of the at least one data symbol are selectable on a user specific basis.

Figure 6:
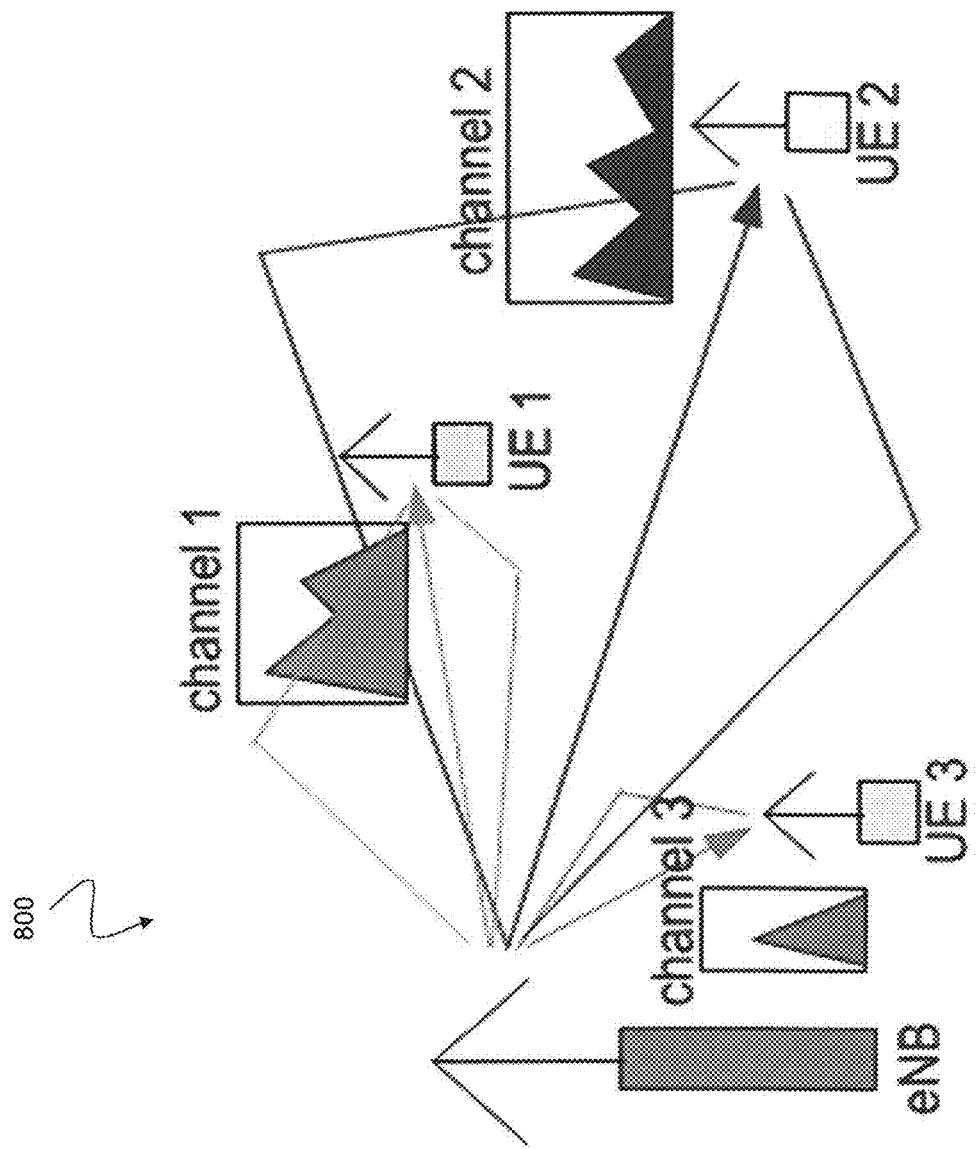
FIG. 6 illustrates an exemplary configuration of a multi-user environment.

Referring to FIG. 6, an exemplary configuration of a multi-user environment is shown. A base station eNB transmits radio signals to multiple users, e.g. a first user equipment UE1, a second user equipment UE2 and a third user equipment UE3. The radio signals experience multi-path fading as depicted in FIG. 6. The channel impulse responses "channel 1" for UE1, "channel 2" for UE2 and "channel 3" for UE3 are depicted in FIG. 6. A novel frame format, also called VG-OFDMA (variable-guard orthogonal frequency division multiple access), is presented in the following that can be advantageously applied in multi-user environments.

Figure 7:
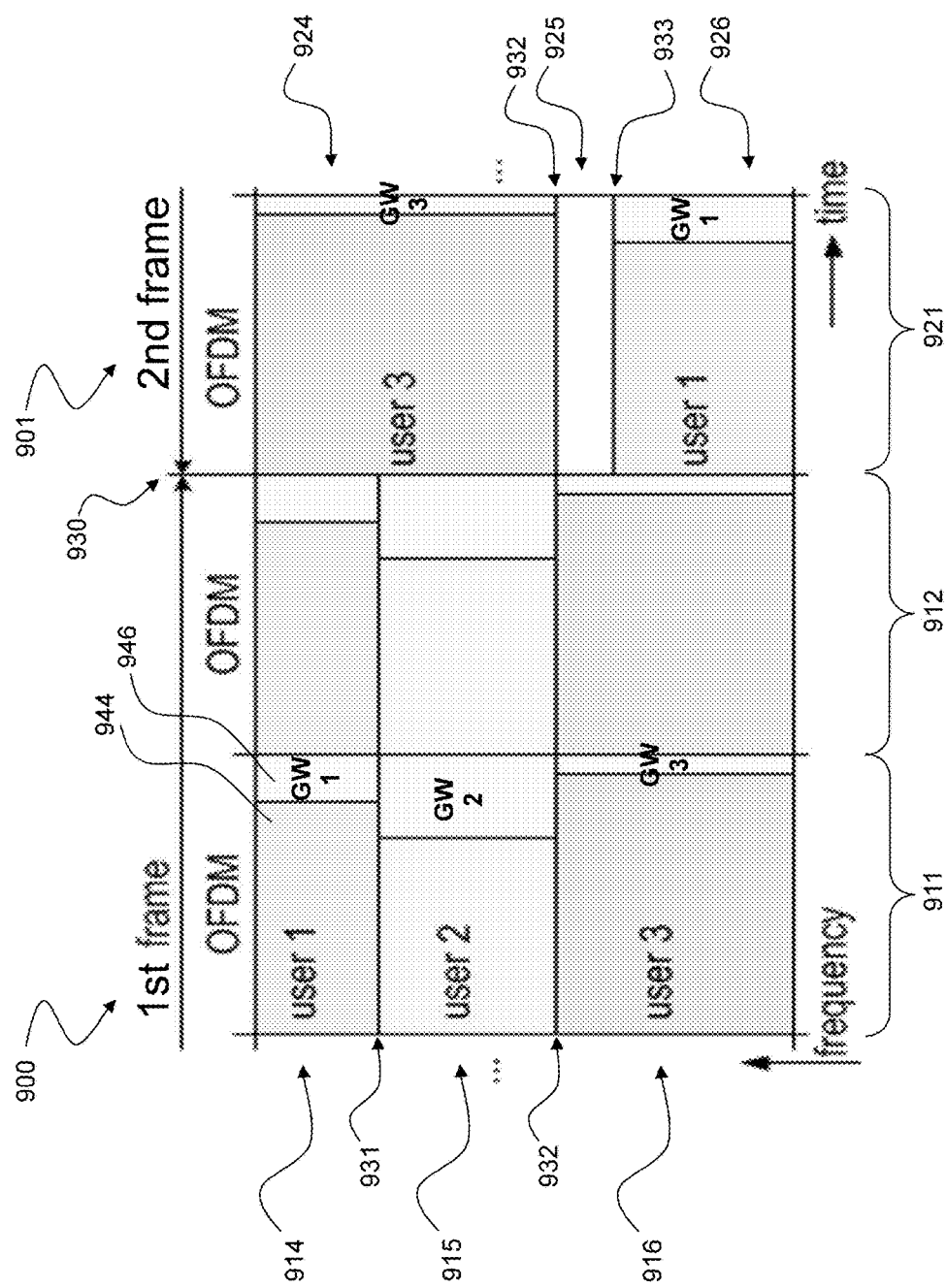
FIG. 7 illustrates an example of a data frame forming a two-dimensional time-frequency frame pattern.

Referring to FIG. 7, an example of data frames 900, 901 forming a two-dimensional frame pattern in a time-frequency representation is shown. FIG. 7 depicts an exemplary detail of two contiguous data frames, a first one 900 and a second one 901. For the first data frame 900 only the two last symbols 911, 912 are depicted in the figure while for the second data frame 901 only the first symbol 921 is depicted in the figure. The data frame 900 includes a plurality of symbols 911, 912 aligned with symbol boundaries 930 in the time direction. Each of the symbols 911, 912 includes a plurality of sub-symbols 914, 915, 916 aligned with sub-symbol boundaries 931, 932 in the frequency direction. Each of the sub-symbols 914, 915, 916 includes a user data portion 944 and a guard interval portion 946. For the data frames 900, 901 at least one of the following parameters is variable during the processing: a size L of the guard interval portion 946, a size N–L of the user data portion 944, a size N of the symbols, a number of symbols the data frame 900, 901 comprises, a content of the guard interval portion 946, a configuration of the sub-symbol boundaries 931, 932 on a data frame basis and a configuration of the symbol boundaries 930 on a data frame basis.

In one example, the symbols 911, 912, 921 are encoded according to an orthogonal frequency division multiplexing technique. In one example, the guard interval portion 946 includes a guard word. In one example, the guard word is a predetermined guard word. In one example, the size of the symbol 911, 912, 921 is variable with respect to a power of two of a basic data symbol size, for example of a byte or a word. In one example, the size L of the guard interval portion 946 is based on at least one of the following parameters: a channel delay spread, a modulation and coding set, a MIMO layer and antenna configuration, and a link direction, e.g., upstream or downstream. In one example, the size N of the symbol 911, 912 and the number of symbols 911, 912 the data frame 900 includes are predetermined and at least one of the size L and content of the guard interval portion 106 of the symbol 102 are selectable on a user specific basis.

With respect to OFDM systems, the symbol format of the data frame 900 depicted in FIG. 7 is also called variable-guard orthogonal frequency-division multiple access format (VG-OFDMA) and the symbols 911, 912, 921 are denoted as OFDM symbols.

In the example depicted in FIG. 7, the sub-symbols 914, 915, 916 carry user-specific information 944, e.g. information of users forming a multi-user system as described above with respect to FIG. 6, and guard interval information 946. With regard to the first data frame 900, the first sub-symbol 914 of the first symbol 911 carries information of a first user UE1, the second sub-symbol 915 of the first symbol 911 carries information of a second user UE2 and the third sub-symbol 916 of the first symbol 911 carries information of a third user UE3. With respect to the frequency domain, sub-symbol boundaries 931, 932 are used for separating the sub-symbols from each other. A first sub-symbol boundary 931 is used for separating the first sub-symbol 914 from the second sub-symbol 915 and a second sub-symbol boundary 932 is used for separating the second sub-symbol 915 from the third sub-symbol 916. The same configuration is applied to the second symbol 912.

With regard to the second data frame 901, a different configuration is used (in this example): The first sub-symbol 924 of the first symbol 921 carries information of the third user UE3, the second sub-symbol 925 of the first symbol 921 carries empty information and the third sub-symbol 926 of the first symbol 921 carries information of the first user UE1. With respect to the frequency domain, a different configuration of the sub-symbol boundaries 932, 933 is used. The second sub-symbol boundary 932 is used for separating the first sub-symbol 924 from the second sub-symbol 925 and a third sub-symbol boundary 933 is used for separating the second sub-symbol 925 from the third sub-symbol 926.

Figure 9:
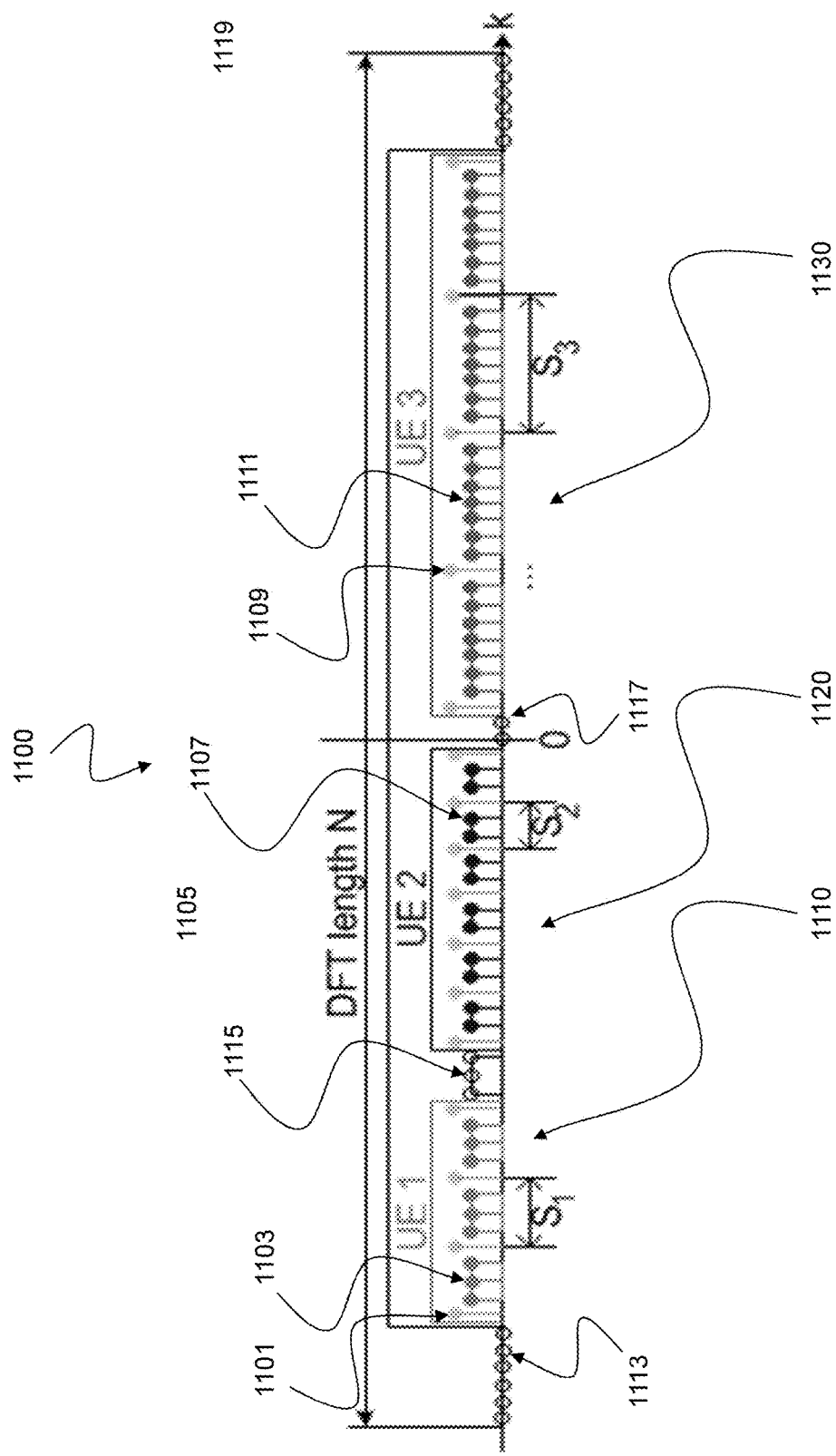
FIG. 9 illustrates an exemplary OFDM format having redundant sub-carrier allocation.

The sub-symbols 914, 915, 916 are defined over a plurality of sub-carriers forming the frequency axis or direction of the 2-dimensional frame pattern. The sub-symbol boundaries 931, 932, 933 are configured with respect to these sub-carriers. The sub-carriers are also illustrated in FIG. 9 described below.

The VG-OFDMA data frame 900 can be constructed from a plurality of VG-OFDM data frames 100, 300 as described above with respect to FIGS. 1 to 2 when stacked in the frequency domain. I.e., the data frame 900 represents an extension of the VG-OFDM concept to multi-user environments.

Like VG-OFDM, the VG-OFDMA format also features a variable guard interval 946 within a framework of fixed-length OFDM symbols embedded in a fixed frame structure 900, 901. Each OFDM symbol 911 may incorporate a number of OFDM sub-symbols 914, 915, 916 separated in frequency and allocated to different users. VG-OFDMA is characterized by user-specific guard interval lengths and guard words (user/link index). Defying common intuition, VG-OFDMA makes it possible that one and the same OFDM symbol incorporates OFDM sub-symbols with different guard intervals.

User stations (US) located at different positions may experience very different multi-path channel delay spreads which are often correlated with the distance to the base station (BS)/eNB, as illustrated in FIG. 6. VB-OFDMA enables each US/BS link to adapt its individual guard interval to the channel conditions actually present on that link, with the objective of optimizing user/link-specific throughput and/or transmission quality.

The main advantages of VG-OFDMA are the following: The variable guard interval can be adapted to the channel and transmission conditions for each link with respect to channel delay spread and other parameters. With regard to channel delay spread $T_i$ the GI ($L_i$, $GW_i$) is adapted to each $T_i$ such that transmission throughput and/or quality are optimized for each user/link individually. With regard to other link parameters, the GI can further be tuned to other user-specific link parameters such as the MCS, MIMO layers/antennas, or link direction. The frame format is independent of GI adaptation. The frame format can remain fixed and common to all users. It is thus simpler to define, standardize, and implement. A suitably defined fixed frame format can accommodate OFDM symbols of user-specific lengths $N_i$ which further extends the range of user-specific GI lengths.

As shown in FIG. 7, VG-OFDMA is characterized by fixed-length frames and OFDM symbols carrying a number of OFDM sub-symbols with user- and/or link-specific guard interval configurations ($L_i$, $GW_i$). In cellular systems such as LTE, the smallest unit in the time/frequency plane that can be assigned to a user is a physical resource block (PRB). In VG-OFDMA, such PRB are preferably organized in resource block groups (RBG) forming user-specific OFDM sub-symbols.

In VG-OFDMA, the adaptation of user-specific GI lengths $L_i$ is not confined to channel delay spreads $T_i$ but may also relate to other user-specific link parameters, in particular, modulation/coding (for instance, at low SNR more ISI is tolerable, so $L_i$ can be small or even zero), MIMO layers (GI lengths can also be layer-specific), MIMO antennas (e.g., $L_i$ can be smaller for beamformed links with less multipath), and link direction (GI lengths may be different for up- and downlink). Under the umbrella of a common frame structure, VG-OFDMA opens very many possibilities to fine-tune individual OFDM/GI configurations to user-specific, link-specific and time-varying channel/transmission conditions.

The transmission system as described above with respect to FIGS. 3 and 4 can be applied to transmission of the frames 900, 901 and so for VG-OFDM(A) transmission. As shown in FIGS. 3 and 4 above, VG-OFDM(A) (sub-)symbols are generated for transmission by clearing the VG-OFDM(A) guard intervals of unwanted signals and then inserting the GW(s). Several methods can be used to solve the challenging first task of clearing the GI section. One such exemplary method features the selection of frequency-domain (FD) sub-carrier symbols such that the GI section of the time-domain (TD) signal is essentially zero. This constraint leads to a complex-number Reed-Solomon (RS) code along FD sub-carriers. Suitable RS codes may be systematic or non-systematic. The former can be implemented by partitioning the sub-carriers into a set of redundant sub-carriers at dedicated positions $k_r$ (carrying complex-valued parity symbols) and another set of data (non-parity) sub-carriers at positions $k_d$ (carrying QAM/PSK data symbols). Techniques reducing unwanted redundant signal energy include choosing favorable positions $k_r$, allowing some residual noise in the GI, or resorting to non-systematic RS coding.

Figure 8:
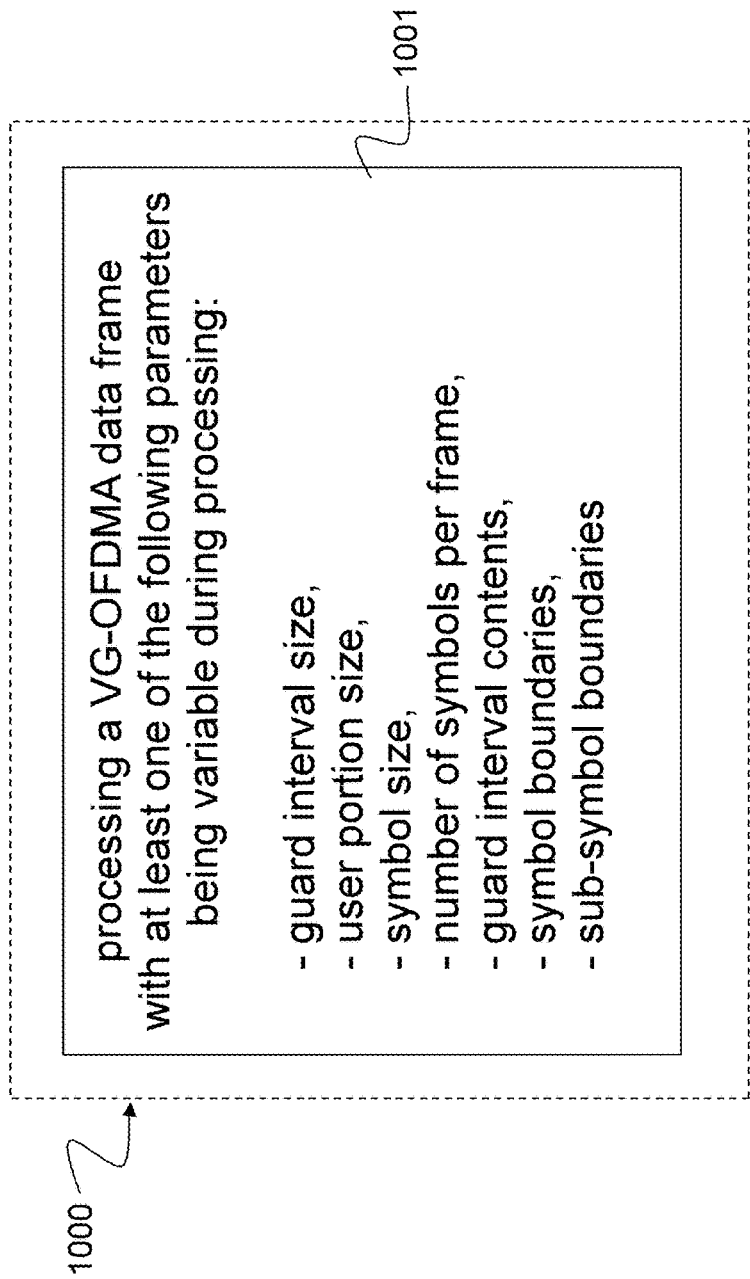
FIG. 8 illustrates a flow diagram of an exemplary method for processing a data frame.

Referring to FIG. 8, a flow diagram of an exemplary method 1000 for processing a data frame is shown. The method 1000 comprises processing 1001 a data frame configured to form a two-dimensional frame pattern in a time-frequency representation within a predetermined frequency and time range, wherein the data frame comprises a plurality of symbols aligned with symbol boundaries in the time direction and wherein each of the symbols comprises a plurality of sub-symbols aligned with sub-symbol boundaries in the frequency direction, wherein each of the sub-symbols comprises a user data portion and a guard interval portion, and wherein at least one of the following parameters is variable during the processing: a size of the guard interval portion, a size of the user data portion, a size of the symbols, a number of symbols the data frame comprises, a content of the guard interval portion, a configuration of the sub-symbol boundaries on a data frame basis, and a configuration of the symbol boundaries on a data frame basis. The method 1000 may process data frames 900, 901 as described above with respect to FIG. 7.

In one example of the method 1000, the sub-symbols are configured to carry user-specific information, e.g. information of a user 1, a user 2 and a user 3 as described above with respect to FIG. 7. The user-specific information may be information of users forming a multi-user system as depicted above with respect to FIG. 6. In one example of the method 1000, the sub-symbol boundaries are configured with respect to sub-carriers defining the frequency direction of the two-dimensional frame pattern as described below with respect to FIG. 9. In one example, the method 1000 comprises partitioning the sub-carriers into a first set of sub-carriers at first frequency positions and into a second set of sub-carriers at second frequency positions in the two-dimensional frame pattern as described below with respect to FIG. 9. In one example of the method 1000, the first set of sub-carriers comprises sub-carriers carrying redundancy information and wherein the second set of sub-carriers comprises sub-carriers carrying user-data information as described below with respect to FIG. 9. In one example of the method 1000, the sub-carriers carrying user-data information are arranged in equal groups bordered by sub-carriers carrying redundancy information as described below with respect to FIG. 9. In one example of the method 1000, a sub-carrier spacing with respect to the groups of sub-carriers carrying user-data information is based on at least one of the following: the size of the symbols and the size of the guard interval portion, in particular according to the relation $S_i<=N/L_i$, where $S_i$ denotes the sub-carrier spacing of an i-th sub-symbol, N denotes the size of the symbols and $L_i$ denotes the size of the guard interval portion of the i-th sub-symbol as described below with respect to FIG. 9. In one example of the method 1000, at least one of the following is a power of two: the size of the symbols, the size of the guard interval portion. In one example, the method 1000 comprises generating the data frame by using a frequency transform whose size is based on the predetermined frequency range as described above with respect to FIGS. 3 and 4.

Referring to FIG. 9, an exemplary OFDM format having redundant sub-carrier allocation is illustrated. The exemplary data frame 1100 is based on sampling and interpolation rather than large block coding, thus greatly reducing the complexity of generating long OFDM symbols. It is characterized by a set of (quasi-)equidistant redundant sub-carrier positions $k_r$ selected such that the redundant symbols at these positions are able to represent (sample) the GI signal before it is removed from the original TD OFDM (sub) symbol. An example of VG-OFDMA sub-carrier allocation—implementing the VG-OFDMA symbol format shown in FIG. 7 above—is illustrated in FIG. 9.

The data frame 1100 forms a two-dimensional frame pattern in a time-frequency representation according to the description above with respect to FIG. 7. The data frame 1100 includes a plurality of symbols aligned with symbol boundaries in the time direction. Due to the frequency domain representation in FIG. 9 only a single symbol is illustrated for a specific time instant. The symbol includes a plurality of sub-symbols 1110, 1120, 1130 aligned with sub-symbol boundaries in the frequency direction. Each of the sub-symbols 1110, 1120, 1130 comprises a user data portion and a guard interval portion according to the representation described above with respect to FIG. 7. At least one of the following parameters is variable during the processing: a size of the guard interval portion, a size of the user data portion, a size of the symbols, a number of symbols the data frame 1100 comprises, a content of the guard interval portion, i.e. the guard word, a configuration of the sub-symbol boundaries on a data frame basis, and a configuration of the symbol boundaries on a data frame basis.

The sub-symbols 1110, 1120, 1130 carry user-specific information, in particular information of users UE1, UE2, UE3 forming a multi-user system as described above with respect to FIG. 6. The sub-symbol boundaries are configured with respect to sub-carriers defining the frequency direction of the two-dimensional frame pattern. As can be seen from the figure, the sub-carriers are partitioned into a first set of sub-carriers at first frequency positions ($k_r$) and into a second set of sub-carriers at second frequency positions ($k_d$) in the two-dimensional frame pattern. The first set of sub-carriers includes sub-carriers 1101, 1105, 1109 carrying redundancy information and the second set of sub-carriers includes sub-carriers 1103, 1107, 1111 carrying user-data information. The sub-carriers 1103, 1107, 1111 carrying user-data information are arranged in equal groups bordered by sub-carriers 1101, 1105, 1109 carrying redundancy information. A sub-carrier spacing $S_1$, $S_2$, $S_3$ with respect to the groups of sub-carriers 1103, 1107, 1111 carrying user-data information is based on at least one of the following: the size of the symbols and the size of the guard interval portion, in particular according to the relation $S_i<=N/L_i$, where $S_i$ denotes the sub-carrier spacing of an i-th sub-symbol, N denotes the size of the symbols and $L_i$ denotes the size of the guard interval portion of the i-th sub-symbol.

In an example, the size of the symbols is a power of two. In an example, the size of the guard interval portion is a power of two. In an example, the data frame 1100 is generated by using a frequency transform whose size is based on the predetermined frequency range.

Within OFDM sub-symbols 1110, 1120, 1130 of bandwidth $B_i$ (total bandwidth B<N), the sampling theorem calls for redundant (user/link-specific) sub-carrier spacings $S_i$ to satisfy $$S_i<=N/L_i \qquad (2)$$

In an exemplary case that N is a power of two, $L_i$ is preferably also a power of two so that equation (2) holds with equality and throughput is maximized. The procedure of actually clearing sub-symbol GIs is relatively simple and can be described as follows: TD signals are first generated via IDFT, TD GI signals are then extracted, rotated, repeated, and finally subtracted from the original TD symbol, thus canceling the GI signal.

FIG. 9 shows the redundant sub-carriers 1101, 1105, 1109 within the occupied parts UE1, UE2, UE3 of the OFDM spectrum, the data carriers 1103, 1107, 1111, and void carriers 1113, 1115, 1117, 1119. The particular OFDM format is characterized by a set $k_r$ of FD redundant sub-carrier indices defined such that the band-pass GI signal (here "band-pass" meaning limited in time-domain) with (two-sided) bandwidth equal to the GI length L can be sampled (here "sampling" in the frequency direction) with no (or little) error.

Figure 10:
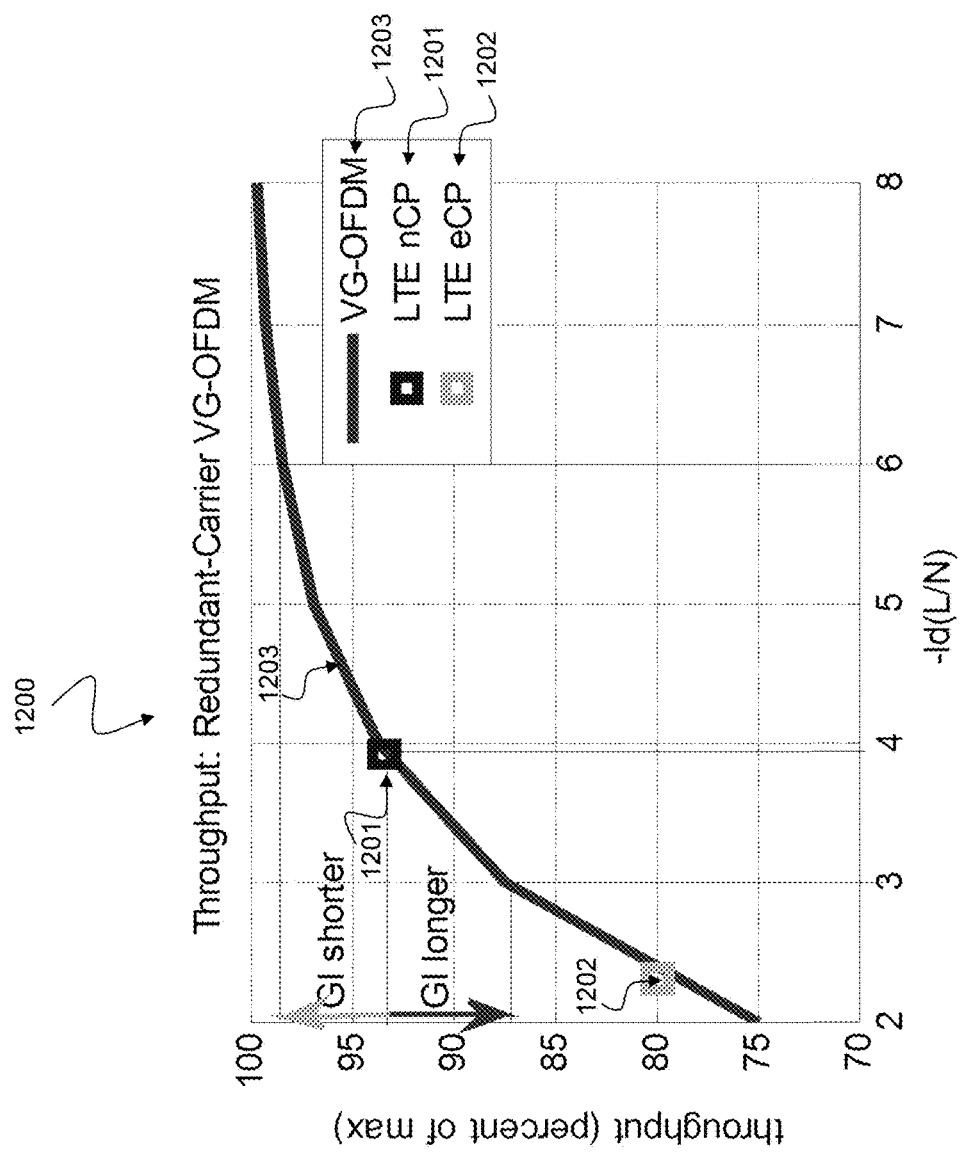
FIG. 10 illustrates a performance diagram of a method for processing a data frame.

Referring to FIG. 10, a performance diagram 1200 of a method for processing a data frame is illustrated. The performance diagram 1200 shows the potential of guard interval fine-tuning in terms of throughput. In this example, the throughput (relative to the limit without GI) of redundant-carrier VG-OFDM(A) 1203 described above is plotted against the GI length $L_i$ (decreasing from left to right) relative to OFDM symbol length N. The throughput of LTE with normal 1201 and extended/MBSFN CP length 1202 is also shown for comparison under otherwise same conditions (number of reference symbols, etc.). By means of shortening the guard interval, VG-OFDM(A) allows the maximum throughput of LTE to increase by up to 6.6% (nCP) and 20% (eCP). Moreover, by the flexibility inherent in the new VG-OFDM(A) format it becomes unnecessary to define and standardize multiple CP-OFDM symbol/frame formats such as nCP, eCP, and MBSFN which can be removed from a future release of the standard.

While this disclosure includes one or more implementations, alterations and/or modifications may be made to the illustrated examples without departing from the scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations.

What is claimed is:

1. A method of processing a data frame of a wireless signal, the method, comprising:
   receiving, by a receiver, the data frame of the wireless signal, wherein the data frame has a predetermined frame size and comprises data symbols configured to form a plurality of sub-carriers in the frequency domain, wherein each of the data symbols comprises a user data portion and a guard interval portion, extracting, by a guard word extractor, the guard interval portion from the data frame;

cancelling, by a guard word canceller, the guard interval portion;

processing, by a processor, the user data portion, wherein the sizes of the guard interval portions in the respective data symbols are variable based on channel conditions within a same frame of the received wireless signal and the frame size is fixed; and adapting the sizes of the variable guard interval portions based on the channel conditions for each link individually.

2. The method of claim 1, wherein the data symbols are encoded according to an orthogonal frequency division multiplexing technique.

3. The method of claim 1, further comprising: clearing the guard interval portions.

4. The method of claim 1, further comprising: inserting guard words into the respective guard interval portions.

5. The method of claim 4, wherein the guard words are predetermined.

6. The method of claim 1, wherein the sizes of each of the data symbols are variable with respect to a power of two of a basic data symbol size.

7. The method of claim 1, further comprising: signaling the sizes of the guard interval portions by using signaling information, wherein the signal information is a data byte or a data word.

8. The method of claim 1, wherein the channel conditions are based on at least one of the following parameters:
a channel delay spread,
a modulation and coding set,
a MIMO layer and antenna configuration, and
a link direction.

9. The method of claim 1, wherein the sizes of the data symbols and the number of data symbols the data frame comprises are predetermined, and wherein at least one of the size and content of the guard interval portions of the data symbols are selectable on a user specific basis.

10. A device for processing a data frame of a wireless signal, the device, comprising:
a receiver configured to receive the data frame of the wireless signal, wherein the data frame has a predetermined frame size and comprises symbols configured to form a plurality of sub-carriers in the frequency domain, wherein each of the symbols comprises a user data portion and a guard interval portion;
a guard word extractor configured to extract the guard interval portion from the data frame;
a guard word canceller configured to cancel the guard interval portion; and
a processor configured to:
process the user data portion,
wherein the sizes of the guard interval portions in the respective symbols are variable based on channel conditions within a same frame of the received wireless signal and the frame size is fixed; and
adapt the sizes of the variable guard interval portions based on the channel conditions for each link individually.

11. A method for processing a data frame of a wireless signal, the method comprising:
receiving, by a receiver, the data frame of the wireless signal, wherein the data frame comprises a plurality of symbols aligned with symbol boundaries in the time direction, wherein each of the symbols comprises a plurality of sub-symbols aligned with sub-symbol boundaries in the frequency direction, wherein each of the sub-symbols comprises a user data portion and a guard interval portion;

extracting, by a guard word extractor, the guard interval portion from the data frame;

cancelling, by a guard word canceller, the guard interval portion;

processing, by a processor, the user data portion configured to form a two-dimensional frame pattern in a time-frequency representation within a predetermined frequency and time range, wherein the sizes of the guard interval portions in the respective symbols are variable based on channel conditions within a same frame of the received wireless signal and the frame size is fixed; and adapting the sizes of the variable guard interval portions based on the channel conditions for each link individually.

12. The method of claim 11, wherein the sub-symbols are configured to carry information of users forming a multi-user system.

13. The method of claim 11, wherein the sub-symbol boundaries are configured with respect to sub-carriers defining the frequency direction of the two-dimensional frame pattern.

14. The method of claim 13, further comprising:
partitioning the sub-carriers into a first set of sub-carriers at first frequency positions and into a second set of sub-carriers at second frequency positions in the two-dimensional frame pattern.

15. The method of claim 14, wherein the first set of sub-carriers comprises sub-carriers carrying redundancy information, and wherein the second set of sub-carriers comprises sub-carriers carrying user-data information.

16. The method of claim 15, wherein the sub-carriers carrying user-data information are arranged in equal groups bordered by sub-carriers carrying redundancy information.

17. The method of claim 16, wherein a sub-carrier spacing with respect to the groups of sub-carriers carrying user-data information is based on at least one of the following: the size of the symbols and the size of the guard interval portion according to the relation $S_i <= N/L_i$, where $S_i$ denotes the sub-carrier spacing of an i-th sub-symbol, N denotes the size of the symbols and $L_i$ denotes the size of the guard interval portion of the i-th sub-symbol.

18. The method of claim 11, wherein at least one of the following is a power of two: the size of the symbols, and the size of the guard interval portion.

19. The method of claim 11, further comprising: generating the data frame by using a frequency transform having a size based on the predetermined frequency range.

20. A device for processing a data frame of a wireless signal, the device comprising:
a receiver configured to receive the data frame of the wireless signal, wherein the data frame comprises a plurality of symbols aligned with symbol boundaries in the time direction, wherein each of the symbols comprises a plurality of sub-symbols aligned with sub-symbol boundaries in the frequency direction, wherein each of the sub-symbols comprises a user data portion and a guard interval portion;
a guard word extractor configured to extract the guard interval portion from the data frame;

a guard word canceller configured to cancel the guard interval portion; and a processor configured to:

process the user data portion configured to form a two-dimensional frame pattern in a time-frequency representation within a predetermined frequency and time range, wherein the sizes of the guard interval portions in the respective sub-symbols are variable based on channel conditions within a same frame; and adapt the sizes of the variable guard interval portions based on the channel conditions for each link individually.

* * * * *